United States Patent [19]

Henely et al.

[11] Patent Number: 4,896,336

[45] Date of Patent: Jan. 23, 1990

[54] DIFFERENTIAL PHASE-SHIFT KEYING DEMODULATOR

[75] Inventors: Steven J. Henely; Mark D. Walby, both of Cedar Rapids, Iowa

[73] Assignee: Rockwell International Corporation, El Segundo, Calif.

[21] Appl. No.: 237,912

[22] Filed: Aug. 29, 1988

[51] Int. Cl.[4] .......................... H03D 3/18; H03K 9/04; H04L 27/22

[52] U.S. Cl. ..................................... 375/80; 329/308; 375/84; 375/97

[58] Field of Search ....................... 375/14, 15, 39, 85, 375/86, 94, 95, 97, 80, 81, 82; 328/151, 127; 341/122; 329/104, 110

[56] References Cited

U.S. PATENT DOCUMENTS

| | | | |
|---|---|---|---|
| 3,669,511 | 6/1972 | Motley | 375/15 |
| 3,800,227 | 3/1974 | Kobayashi | 375/87 |
| 4,216,543 | 8/1980 | Cagle et al. | 375/95 |
| 4,253,186 | 2/1981 | Godard | 375/15 |
| 4,800,577 | 1/1989 | Tachita et al. | 375/94 |

OTHER PUBLICATIONS

J. F. Roesch, Jr., "An All Digital Demodulator Using Off-the-Shelf VLSI Technology," Milcom Trans., vol. 3, pp. 46.4.1–46.4.5, Oct. 1986.
F. D. Natali, "Noise Performance of a Cross-Product AFC With Decision Feedback for DPSK Signals," IEEE Trans. Commun., vol. COM-34, No. 3, pp. 303–307, Mar. 1986.

*Primary Examiner*—Benedict V. Safourek
*Attorney, Agent, or Firm*—John C. McFarren; M. Lee Murrah; H. Fredrick Hamann

[57] ABSTRACT

A digital modem is provided for demodulation of differential phase-shift keyed (DPSK) signals in a land mobile satellite receiver. The DPSK demodulator comprises a coarse frequency and lock detect module for identifying and estimating the frequency of the input signal, a numerically controlled oscillator (NCO) for generating in-phase and quadrature signals from the input signal, one pair each of delayed and non-delayed integrate and dump (I&D) modules, a symbol timing module for achieving symbol synchronization by determining the dump time of the I&D modules, a dot product detector for receiving the output of the non-delayed I&D modules and providing a detected data output, and an AFC loop comprising a cross product detector and an AFC loop filter that provides feedback to the NCO and lock detect module. The DPSK demodulator achieves symbol synchronization independent of carrier phase or frequency and at low signal-to-noise ratios. Overall, the modem achieves the theoretical bit error rate capability of DPSK on a narrow band, white Gaussian noise channel with minimal implementation loss.

14 Claims, 1 Drawing Sheet

DIFFERENTIAL PHASE-SHIFT KEYING DEMODULATOR

TECHNICAL FIELD

The present invention relates to data communications systems and, in particular, to a digital modem that determines symbol timing independent of carrier phase and without the use of square-law non-linearity.

BACKGROUND OF THE INVENTION

Data communication on the land mobile satellite channel using small, low-gain antennas presents challenges in the design of digital modems. Demodulation of signals with marginal carrier-to-noise ratios requires that processing techniques achieve the highest possible efficiency. Frequency variations due to Doppler shift and oscillator drift can be a significant fraction of the symbol rate and must be tracked to minimize detection losses. Also, maintaining symbol synchronization is critical in the presence of multipath fading and shadowing experienced in the land mobile satellite environment.

An all digital demodulator using off-the-shelf VLSI components is known in the prior art. In particular, a multirate binary phase shift keying (BPSK) demodulator using the digital VLSI implementation is disclosed in J. F. Roesch, Jr., "An All Digital Demodulator Using Off-the-Shelf VLSI Technology," Milcom. Trans., Vol. 3, pp. 46.4.1–46.4.5, October 1986, which is incorporated herein by reference.

Power efficiency is a major consideration in the land mobile satellite system because a low-gain, omnidirectional antenna is a requirement. However, an omnidirectional antenna will not effectively discriminate between direct-path signal energy and reflected signal energy. With the effects of Doppler shift, these multipath signals can cause random variations in the signal amplitude and phase. In the land mobile satellite channel, multipath fading may be too severe to allow effective estimation of the carrier phase for coherent demodulation. Therefore, there is a need for a digital modem that achieves symbol synchronization independently of carrier phase or frequency at low signal-to-noise ratios. In addition, the digital modem should improve acquisition speed and reliability relative to the traditional square-law nonlinearity of a bandpass filter approach.

SUMMARY OF THE INVENTION

The present invention is a digital modem designed for operation in data communications systems where signal-to-noise ratios are low and frequency drifts are a significant fraction of the symbol rate. In particular, the digital modem of the present invention was developed for the land mobile satellite channel and employs differential phase-shift keying (DPSK) demodulation. Since DPSK requires only an estimate of the carrier frequency, its performance is less sensitive to phase errors caused by a multipath fading environment.

The modem of the present invention comprises a digital signal processor (DSP). The DSP includes analog-to-digital (A/D) and digital-to-analog (D/A) converters, a numerically controlled oscillator (NCO), integrate and dump (I&D) filters, a symbol timing module, dot and cross-product detectors, an automatic frequency control (AFC) module, and a coarse frequency estimate and lock detect module.

In the digital modem of the present invention, the quantized input signal is filtered by the integrate and dump operation after the carrier frequency ambiguity has been narrowed by the coarse frequency module. The integrators are dumped at the end of each symbol interval to reduce intersymbol interference. In the symbol timing module, a digital data transition tracking loop estimates symbol timing independent of carrier phase. The symbol timing module adjusts the integration window to align the integrate and dump filters with received data symbol boundaries prior to AFC loop lock. The overall demodulator performance achieves the theoretical bit error rate (BER) capability of DPSK on a narrow band, while Gaussian noise (WGN) channel with minimal implementation loss.

BRIEF DESCRIPTION OF THE DRAWINGS

For a more complete understanding of the present invention and for further advantages thereof, reference is made to the following Description of the Preferred Embodiment taken in conjunction with the accompanying Drawings, in which.

DESCRIPTION OF THE PREFERRED EMBODIMENT

The digital modem of the present invention was designed for demodulation of differential phase-shift keyed (DPSK) signals used in a land mobile satellite receiver. The modem comprises a digital signal processor (DSP) that performs the functions of the DPSK demodulator. In the preferred embodiment of the present invention, the DSP comprises a Texas Instruments TMS32020.

Figure 1:
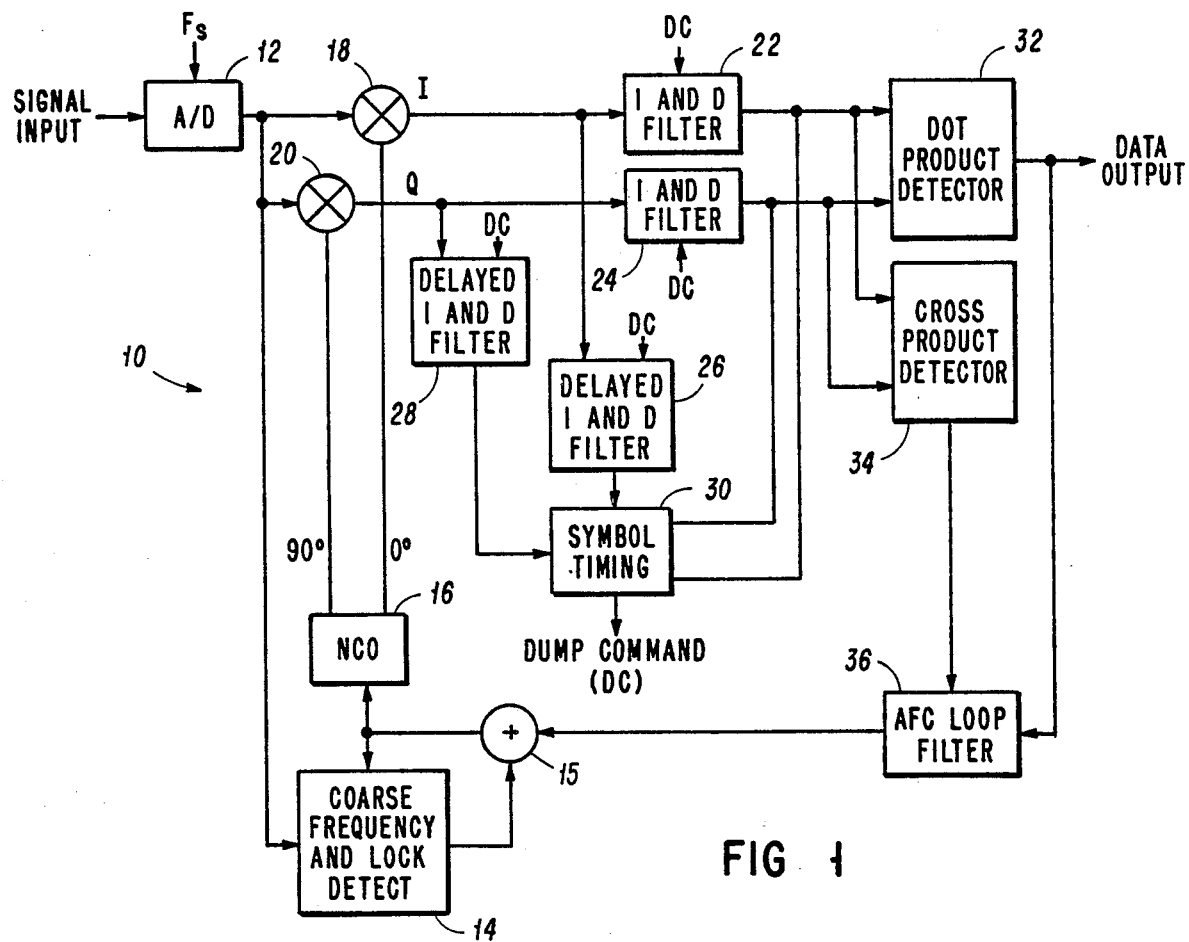
FIG. 1 is a block diagram of a DPSK demodulator of the present invention.

Referring to FIG. 1, the DPSK demodulator of the present invention is generally indicated by reference numeral 10. An input signal, typically having a low signal-to-noise ratio and subject to multipath fading, is converted by A/D converter 12. The quantized input signal is provided to a coarse frequency and lock detect (CFLD) module 14 that analyzes the quantized signal to provide an estimate of the frequency of the input signal to demodulator 10. The output of CFLD 14 is fed to an adder 15 which combines it with a signal from an AFC loop filter 36 (to be discussed hereinafter) and feeds the result to both CFLD 14 and NCO 16. An output of CFLD 14 is provided to a numerically controlled oscillator (NCO) 16. NCO 16 uses the addition trigonometric identities:

$$\cos(A+B) = \cos A \cos B - \sin A \sin B$$

$$\sin(A+B) = \sin A \cos B + \cos A \sin B$$

to decrease the number of table look-up locations required to generate the functions $\sin(f_o/f_s)k$ and $\cos(f_o/f_s)k$, where $f_o$ is the output frequency of NCO 16 and $f_s$ is the sample clock rate. The look-up table contains 64 locations for each of the following functions: coarse sine (sin A) and cosine (cos A), and fine sine (sin B) and cosine (cos B).

The primary computational element of NCO 16 is an accumulator. The size of the accumulator, the sampling rate, and the magnitude of the number input to the accumulator determine the rate at which the accumulator rolls over (i.e., the frequency output of NCO 16). The output frequency of NCO 16 can be represented as:

$$f_o = f_s P_i / 2^N \text{ for } -2^{N-1} < P_i > 2^{N-1},$$

where:
$f_s$ = sample clock rate
N = number of accumulator bits
$P_i$ = instantaneous phase input to the accumulator.

NCO 16 accumulates the instantaneous phase input $P_i$ in a fourteen bit accumulator. The least significant six bits of the accumulator are used to address the fine look-up locations for sine and cosine. The next most significant six bits of the accumulator address the coarse sine and cosine locations. The addition trigometric identities are used to combine the fine and coarse look-up values to form the sine and cosine functions. The sine and cosine functions calculated for the first quadrant are adjusted to represent the actual quadrant indicated by the most significant two bits of the fourteen bit accumulator. The sine and cosine functions output by NCO 16 are mixed with the quantized input from A/D 12 multipliers 18 and 20 to generate the in-phase (I) and quadrature (Q) signals, respectively.

The I and Q frequency components are filtered by a first set of integrate and dump (I&D) filters 22 and 24, respectively, and by a second set of delayed I&D filters 26 and 28, respectively. In order to avoid intersymbol interference, the integrators are reset (dumped) at the end of each symbol interval.

The first set of I&D filters 22 and 24 integrate over the symbol period to produce filtered I and Q signals that are decimated from an intermediate frequency (IF) sampling rate to the data rate. The filtered I and Q signals from I&D filters 22 and 24, respectively, are passed to the dot and cross product detectors 32 and 34, respectively, and to a symbol timing module 30. The second set of I&D filters 26 and 28 process the I and Q signals delayed by one-half symbol period from the first set of I&D filters 22 and 24. Instead of dumping at the end of the signalling interval, I&D filters 26 and 28 dump in the middle of the signalling interval when the error word is zero.

Symbol timing module 30 determines the dump command (DC) of the I&D filters, thus establishing symbol synchronization. A symbol transition and its direction are detected on both the I and Q channels. The product of the direction sign on the Q channel multiplied by the output of the delayed Q integrator is added to the product of the direction sign on the I channel multiplied by the output of the delayed I integrator. The result of adding the output of the I and Q delayed integrators is a measure of the symbol timing error.

Figure 2:
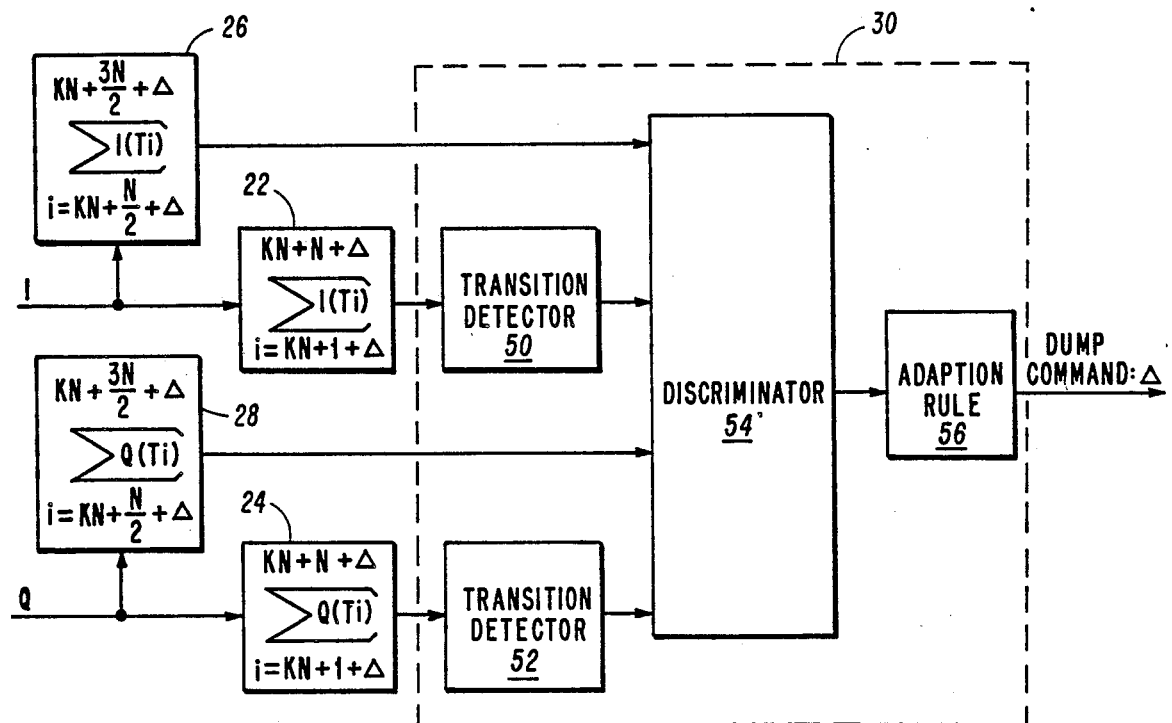
FIG. 2 is a functional block diagram of the digital data transition tracking loop of the symbol timing module of the present invention.

The digital data transition tracking loop of symbol timing module 30 is illustrated in functional block diagram form in FIG. 2. An error signal for symbol timing is based on the observation that when a non-return to zero (NRZ) data transition occurs, the integral from one-half symbol before the transition to one-half symbol after the transition should be zero (ignoring the effects of intersymbol interference and channel noise). This is also true for the integral of a sinusoidal signal that experiences a 180 degree phase shift.

As illustrated in FIG. 2, transition detectors 50 and 52 determine whether a transition has occurred, and if so, calculate the direction of the transition. This information, along with the delayed integrator outputs, is input to a data transition discriminator 54 that calculates the symbol timing error as follows:

$$E_n = [I_n - I_{n-1}]^* (I_{n-\frac{1}{2}}) + [Q_n - Q_{n-1}]^* (Q_{n-\frac{1}{2}}).$$

The error signal calculated by discriminator 54 is input to adaption rule 56 which provides the dump command to the I&D filters. Varying the loop gain of the digital data transition tracking loop of FIG. 2 allows fast symbol synchronization during acquisition while providing for a narrow loop bandwidth during tracking. Furthermore, the digital data transition tracking loop derives the symbol timing error independent of carrier phase and without the use of the traditional square-low nonlinearity of a bandpass filter approach.

Referring again to FIG. 1, a dot product detector 32 estimates the value of the data bit by differential detection of the outputs of I&Q filters 22 and 24. Dot product detector 32 multiplies the I signal delayed by one symbol (one sample at the decimated rate) with the I signal. This result is added to the product of the Q signal delayed by one symbol multiplied by the Q signal. The sign of the dot product result is the NRZ detected data bit, which is output by dot product detector 32.

A cross product detector 34 multiplies the I signal by the Q signal delayed by one symbol. This result is subtracted from the product of the Q signal multiplied by the I signal delayed by one symbol. The cross product detector result is an estimate of the difference between the frequency of the input signal and the output of NCO 16. The sign of this frequency estimate is a function of the received data phase. Dependency on the data phase is eliminated by multiplying the cross product estimate of the NCO frequency offset by the NRZ detected data bit. The result is a cross product detector error estimate that is proportional to the NCO frequency offset.

The output of cross product detector 34 is input to an AFC loop filter 36. In AFC loop filter 36, the cross product detector error estimate is filtered by a lead-lag recursive filter and fed back to NCO 16. The loop filter comprises a one-pole low-pass filter. The transfer function for the one-pole filter in the S domain is given by:

$$F(s) = K_L(1 + a/s).$$

Using the bilinear tranform to convert to the z domain, the function may be written as:

$$u_n = u_{n-1} + (K_L a T_d/2) e_{n-1} + K_L(1 + a T_d/2) e_n.$$

The gain and bandwidth of the AFC loop are specified by the filter coefficients $K_L$ and a.

A lock detect function is performed by CFLD 14. When AFC lock is detected, the symbol timing threshold and the a and $K_L$ AFC loop parameters can be changed so that bit error performance and loop stability are improved. This allows a fast lock time during acquisition as well as better performance under low signal-to-noise and fading conditions. Loss of AFC loop lock is determined by comparing the coarse frequency estimate to the frequency output of NCO 16. If the difference exceeds the cross product detector pull-in range for a specified number of trials, the coarse frequency estimate is added to the AFC filter output (fine frequency) and the sum determines the NCO frequency output.

DPSK demodulator 10 achieves symbol synchronization independently of carrier phase or frequency and at low signal-to-noise ratio. DPSK 10 improves acquisition speed and reliability relative to the traditional square-law nonlinearity of a bandpass filter approach. In the presence of multipath fading and shadowing, the tracking system does not require re-acquisition or resetting. In overall performance, demodulator 10 achieves the theoretical bit error rate capability of DPSK on a narrow band, white Gaussian noise channel with minimal implementation loss.

Although the present invention has been described with respect to a specific embodiment thereof, various changes and modifications may be suggested to one skilled in the art and it is intended that the present invention encompass such changes and modifications as fall within the scope of the appended claims.

We claim:

1. A digital modem for processing an input signal, comprising:
    means for estimating the input signal frequency;
    means for receiving said frequency estimate and said input signal, and generating in-phase and quadrature signals;
    means for integrating and dumping said in-phase and quadrature signals;
    means for determining a dump time of said integrate and dump means;
    means for receiving said integrated and dumped signals and generating a data output; and
    an AFC loop for changing the frequency estimate in response to the data output.

2. The digital modem of claim 1, wherein said input signal estimating means comprises a coarse frequency and lock detect module.

3. The digital modem of claim 1, wherein said means for generating in-phase and quadrature signals is a numerically controlled oscillator.

4. The digital modem of claim 1, wherein said means for determining a dump time comprises a symbol timing module for achieving symbol synchronization.

5. The digital modem of claim 1, wherein said integrating and dumping means comprises a first pair of non-delayed integrate and dump filters and a second pair of delayed integrate and dump filters.

6. The digital modem of claim 1, wherein said AFC loop comprises:
    a cross product detector for receiving said integrated and dumped signals; and
    an AFC loop filter that provides feedback to said frequency estimating means and said in-phase and quadrature signal generating means.

7. The digital modem of claim 1, wherein said AFC loop filter comprises a one-pole, low-pass filter.

8. A differential phase-shift keying (DPSK) demodulator for processing an input signal, comprising:
    a coarse frequency and lock detector for identifying and estimating the input signal frequency;
    a numerically controlled oscillator for receiving said frequency estimate and said input signal, and generating in-phase and quadrature signals;
    an integrate and dump filter for filtering said in-phase and quadrature signals;
    a symbol timing module for determining a dump time for said integrate and dump filter;
    a dot product detector for receiving said filtered signals and generating a data output;
    a cross product detector for receiving said filtered signals; and
    an AFC loop filter for providing feedback to said numerically controlled oscillator and said coarse frequency and lock detector.

9. The demodulator of claim 8, wherein said AFC loop filter comprises a one-pole, low-pass filter.

10. The demodulator of claim 8, wherein said integrate and dump filter comprises a first pair of non-delayed integrate and dump filters and a second pair of delayed integrate and dump filters.

11. The demodulator of claim 8, further comprising an analog-to-digital converter for converting said input signal to a quantized signal for input to said coarse frequency and lock detector.

12. A method of demodulating a low signal-to-noise ratio input signal, comprising the steps of;
    estimating the input signal frequency;
    generating in-phase and quadrature signals from said input signal frequency estimate;
    integrating said in-phase and quadrature signals;
    determining a dumping time for said integrated in-phase and quadrature signals;
    dumping said integrated in-phase and quadrature signals;
    generating a data output derived from said integrated and dumped in-phase and quadrature signals;
    generating a cross product of said integrated and dumped in-phase and quadrature signal;
    providing an AFC loop filter for said cross product; and
    providing a feedback signal from said AFC loop filter for use in estimating the input signal frequency and generating said in-phase and quadrature signals.

13. The method of claim 12, wherein the step of integrating said in-phase and quadrature signals includes decimating from an intermediate frequency sampling rate to a data rate.

14. A digital modem for processing a data signal, comprising:
    means for estimating the data signal frequency;
    means for receiving said frequency estimate and said data signal and generating in-phase and quadrature signals;
    means for integrating and dumping said in-phase and quadrature signals, comprising a pair of non-delayed integrate and dump filters and a second pair of delayed integrate and dump filters;
    means for determining a dump time of said integrate and dump means; and
    means for receiving said integrated and dumped signals and generating a data output, comprising a dot product detector that determines a value of a data bit by differential detection of the output of said integrate and dump filters.

* * * * *